United States Patent [19]

Sphar

[11] Patent Number: 5,373,809
[45] Date of Patent: Dec. 20, 1994

[54] PET CAGE DOORS WITH RAISED CENTRAL SECTIONS

[76] Inventor: Wayne A. Sphar, 4110 Jefferson Ave., Avella, Pa. 15312

[21] Appl. No.: 224,505

[22] Filed: Apr. 7, 1994

[51] Int. Cl.⁵ .................. A01K 1/00; A01K 31/10
[52] U.S. Cl. ................................. 119/17; 119/19
[58] Field of Search .......................... 119/17, 19, 15

[56] References Cited

U.S. PATENT DOCUMENTS

| | | | |
|---|---|---|---|
| 1,107,871 | 8/1914 | Alkire et al. | 119/19 |
| 2,822,780 | 2/1958 | Buell | 119/17 |
| 3,058,445 | 10/1962 | Johnson | 119/17 |
| 3,490,417 | 1/1970 | Swinney | 119/19 |
| 4,046,107 | 9/1977 | Kuster | 119/17 |
| 4,781,147 | 11/1988 | Delino, Jr. | 119/17 |
| 5,010,848 | 4/1991 | Rankin | 119/17 |
| 5,168,829 | 12/1992 | Dietrich | 119/17 |

Primary Examiner—Paul J. Hirsch
Attorney, Agent, or Firm—Michael J. Colitz, Jr.

[57] ABSTRACT

A pet cage door with a raised central section comprising a rectangular screen formed of a plurality of spaced horizontal and vertical wires coupled in a mesh-like configuration and constituting a door, the door being positionable over the front screen of an animal cage formed with a rectangular opening of a predetermined height and width, the door being formed of horizontal and vertical wires with a height and width greater than the height and width of the opening; the rectangular screen having a raised central portion and peripheral regions formed vertically and horizontally as extensions of the central portion, the peripheral portions being beveled at an angle with respect to the central portion and terminating in horizontal and vertical end wires adapted to contact the front screen of the cage when the door is in a closed orientation; a plurality of wire loops encompassing an endmost wire of the door and an adjacent wire of the cage front screen to constitute a hinge for opening and closing the door, at least one of the loops adapted to be located between an endmost wire of the door and cage front screen to preclude excess shifting of the door with respect to the opening; and a locking member formed from a semi-rigid wire having a loop at its central extent secured by wires to the central portion of the door along one edge remote from the hinge, the loop extending to a location beyond the door and opening and formed with a curve adapted to be releasably moved by a user to encompass a central wire of the cage front for locking the door with respect to the opening.

3 Claims, 4 Drawing Sheets

PET CAGE DOORS WITH RAISED CENTRAL SECTIONS

BACKGROUND OF THE INVENTION

1. Field of the Invention

The present invention relates to pet cage doors with raised central sections and more particularly pertains to closing an aperture in an animal cage through a door having an offset, high-profile central section.

2. Description of the Prior Art

The use of pet cages and doors is known in the prior art. More specifically, pet cages and doors heretofore devised and utilized for the purpose of securing animals within cages having doors are known to consist basically of familiar, expected, and obvious structural configurations, notwithstanding the myriad of designs encompassed by the crowded prior art which has been developed for the fulfillment of countless objectives and requirements.

The prior art discloses a large number of pet cages and doors. By way of example, U.S. Pat. No. 3,690,299 to Johnson discloses a pet door apparatus.

U.S. Pat. No. 5,016,926 to Sharp discloses a latching mechanism.

U.S. Pat. No. 5,036,796 to deMuy discloses a small animal cage.

U.S. Pat. No. 5,097,796 to Reimers discloses an animal cage and door latch.

Lastly, U.S. Pat. No. 5,168,829 to Dietrich discloses a versa cage system.

In this respect, the new and improved pet cage door with offset planar section according to the present invention substantially departs from the conventional concepts and designs of the prior art, and in doing so provides an apparatus primarily developed for the purpose of closing an aperture in an animal cage through a door having an offset, high-profile central section.

Therefore, it can be appreciated that there exists a continuing need for new and improved pet cage doors with raised central sections which can be used for closing an aperture in an animal cage through a door having an offset, high-profile central section. In this regard, the present invention substantially fulfills this need.

SUMMARY OF THE INVENTION

In view of the foregoing disadvantages inherent in the known types of pet cages and doors now present in the prior art, the present invention provides new and improved pet cage doors with raised central sections. As such, the general purpose of the present invention, which will be described subsequently in greater detail, is to provide new and improved pet cage doors with raised central sections and methods which have all the advantages of the prior art and none of the disadvantages.

To attain this, the present invention essentially comprises a new and improved pet cage door with a raised central section comprising, in combination, a rectangular screen formed of a plurality of spaced horizontal and vertical wires coupled in a mesh-like configuration and constituting a door, the door being positionable over the front screen of an animal cage formed with a rectangular opening of a predetermined height and width, the door being formed of horizontal and vertical wires with a height and width greater than the height and width of the opening; the rectangular screen having a raised central portion and peripheral regions formed vertically and horizontally as extensions of the central portion, the peripheral portions being beveled at an acute angle with respect to the central portion and terminating in horizontal and vertical end wires adapted to contact the front screen of the cage when the door is in a closed orientation; a plurality of wire loops encompassing an endmost vertical wire of the door and an adjacent vertical wire of the cage front screen to constitute a hinge for opening and closing the door, at least one of the loops adapted to be located between a vertical wire of the door and cage front screen to preclude excess vertical shifting of the door with respect to the opening; a locking member formed from a semi-rigid wire having a loop at its central extent secured by wires to the central portion of the door along one vertical edge remote from the hinge, the loop extending horizontally to a location beyond the door and opening and formed with a curve adapted to be releasably moved by a user to encompass a central horizontal wire of the cage front for locking the door with respect to the opening; and a plurality of plastic door guards of a generally C-shaped configuration positionable over the opening of the door to promote safety for movement of the hands and arms of a user and a pet through the opening when the door is opened.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved pet cage doors with raised central sections which have all the advantages of the prior art pet cages and doors and none of the disadvantages.

It is another object of the present invention to provide new and improved pet cage doors with raised central sections which may be easily and efficiently manufactured and marketed.

It is a further object of the present invention to provide new and improved pet cage doors with raised central sections which are of a durable and reliable construction.

An even further object of the present invention is to provide new and improved pet cage doors with raised central sections which are susceptible of a low cost of manufacture with regard to both materials and labor, and which accordingly are then susceptible of low prices of sale to the consuming public, thereby making such new and improved pet cage doors with raised central sections economically available to the buying public.

Still yet another object of the present invention is to provide new and improved pet cage doors with raised central sections which provide in the apparatuses and methods of the prior art some of the advantages thereof, while simultaneously overcoming some of the disadvantages normally associated therewith.

Even still another object of the present invention is to close an aperture in an animal cage through a door having an offset, high-profile central section.

Lastly, it is an object of the present invention to provide a pet cage door with raised central section comprising a rectangular screen formed of a plurality of spaced horizontal and vertical wires coupled in a mesh-like configuration and constituting a door, the door being positionable over the front screen of an animal cage formed with a rectangular opening of a predetermined height and width, the door being formed of horizontal and vertical wires with a height and width greater than the height and width of the opening; the rectangular screen having a raised central portion and peripheral regions formed vertically and horizontally as extensions of the central portion, the peripheral portions being beveled at an angle with respect to the central portion and terminating in horizontal and vertical end wires adapted to contact the front screen of the cage when the door is in a closed orientation; a plurality of wire loops encompassing an endmost wire of the door and an adjacent wire of the cage front screen to constitute a hinge for opening and closing the door, at least one of the loops adapted to be located between an endmost wire of the door and cage front screen to preclude excess shifting of the door with respect to the opening; and a locking member formed from a semi-rigid wire having a loop at its central extent secured by wires to the central portion of the door along one edge remote from the hinge, the loop extending to a location beyond the door and opening and formed with a curve adapted to be releasably moved by a user to encompass a central wire of the cage front for locking the door with respect to the opening.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
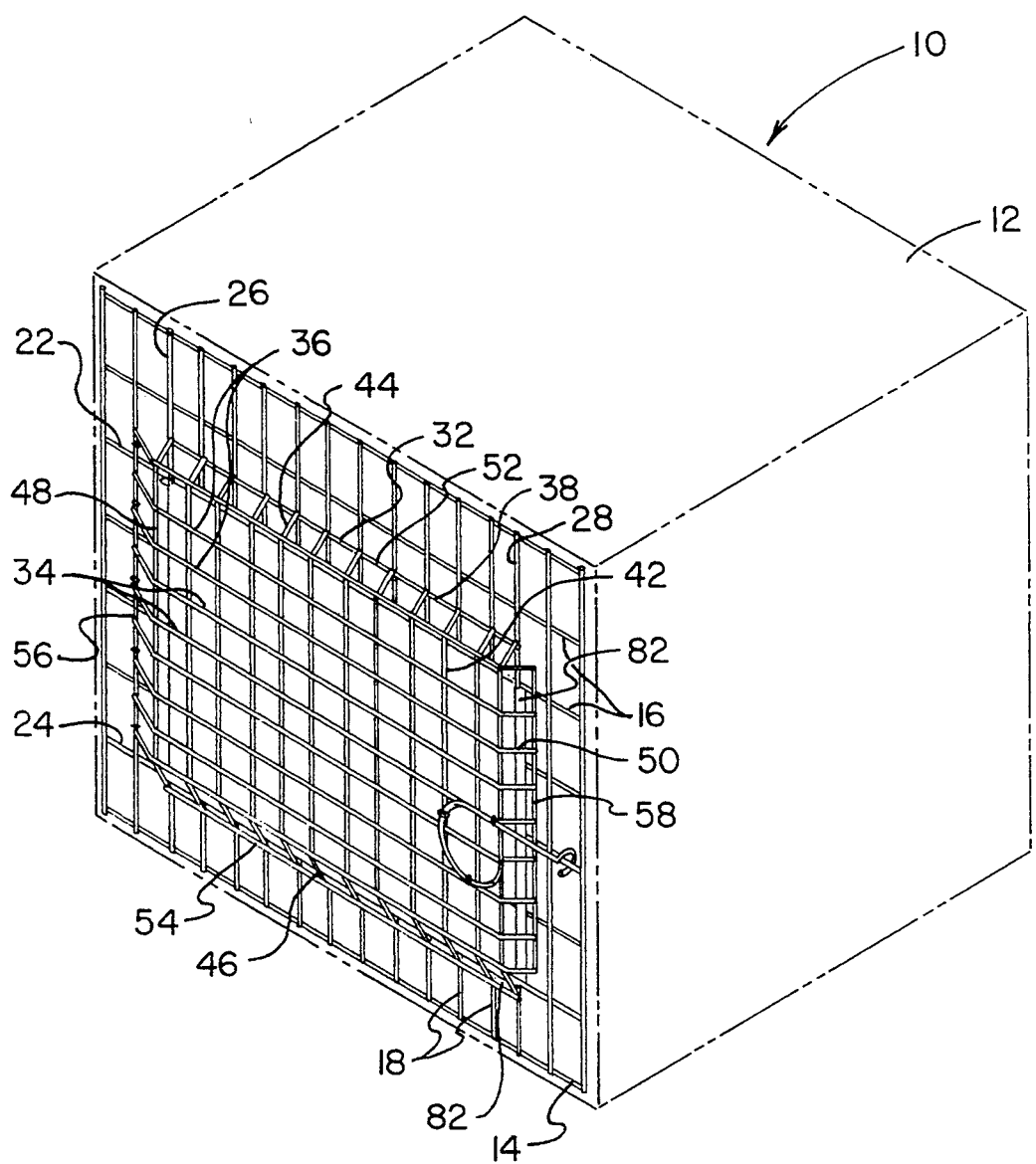
FIG. 1 is a perspective illustration of an animal cage illustrating the preferred embodiment of the new and improved pet cage door with offset planar section constructed in accordance with the principles of the present invention.
Figure 2:
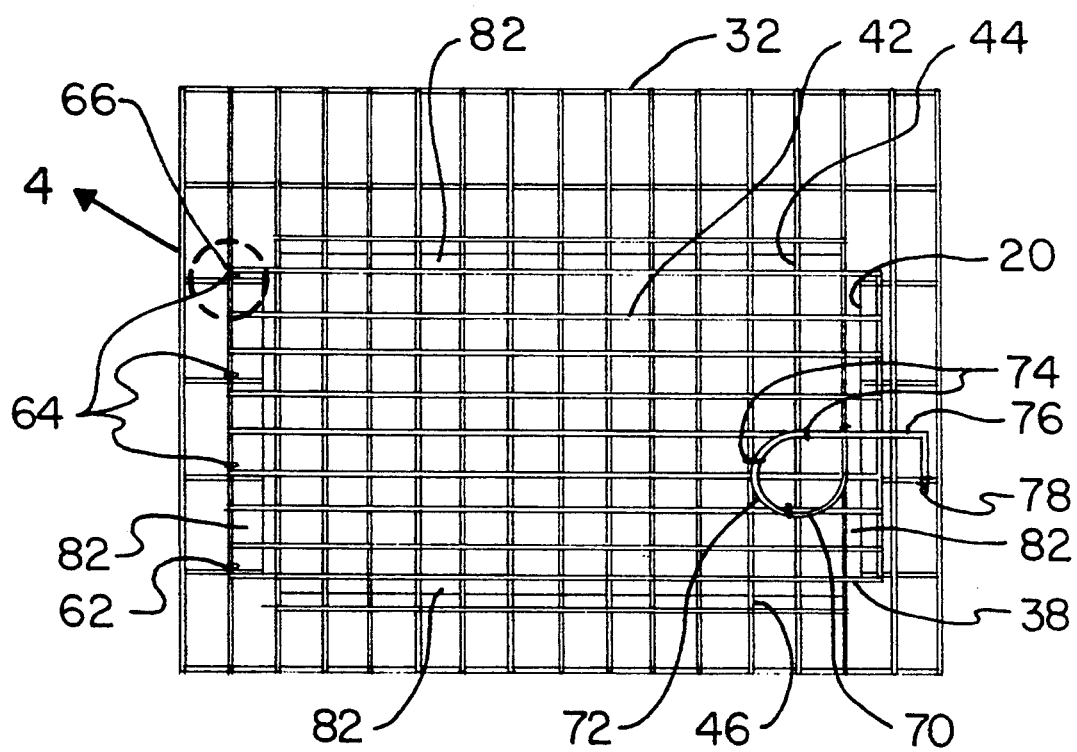
FIG. 2 is a front elevational view of the door and cage front illustrated in FIG. 1.
Figure 3:
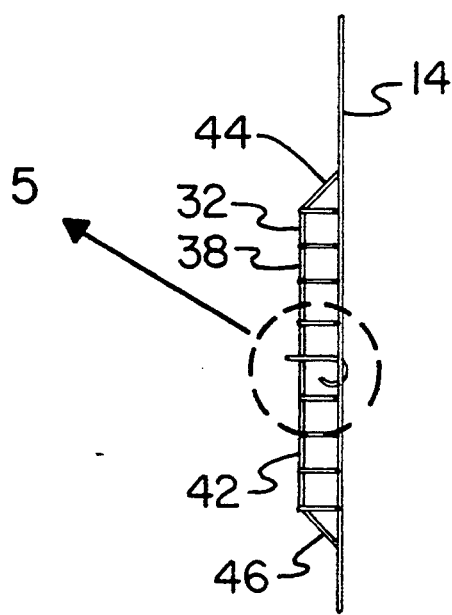
FIG. 3 is an enlarged end view of the locking mechanism for the door illustrated in FIGS. 1 and 2.
Figure 4:
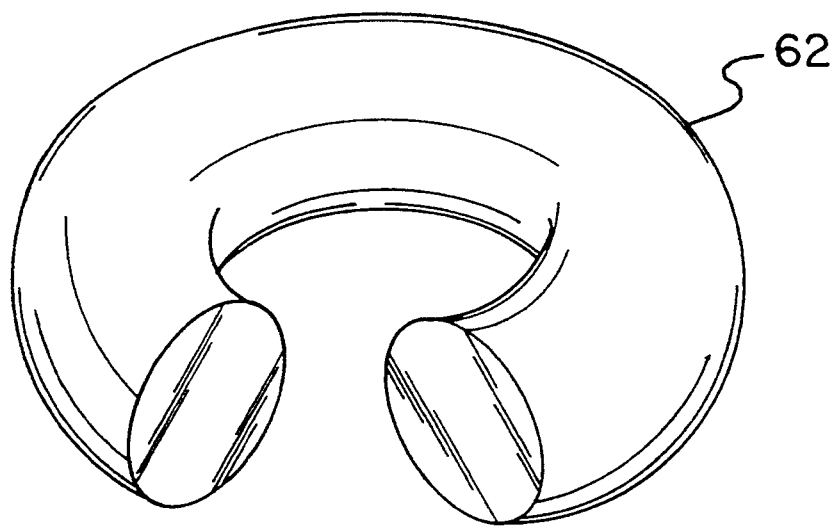
FIG. 4 is an enlarged showing of the hinge area coupling the door and cage front taken at the circle 4 of FIG. 2.
Figure 5:
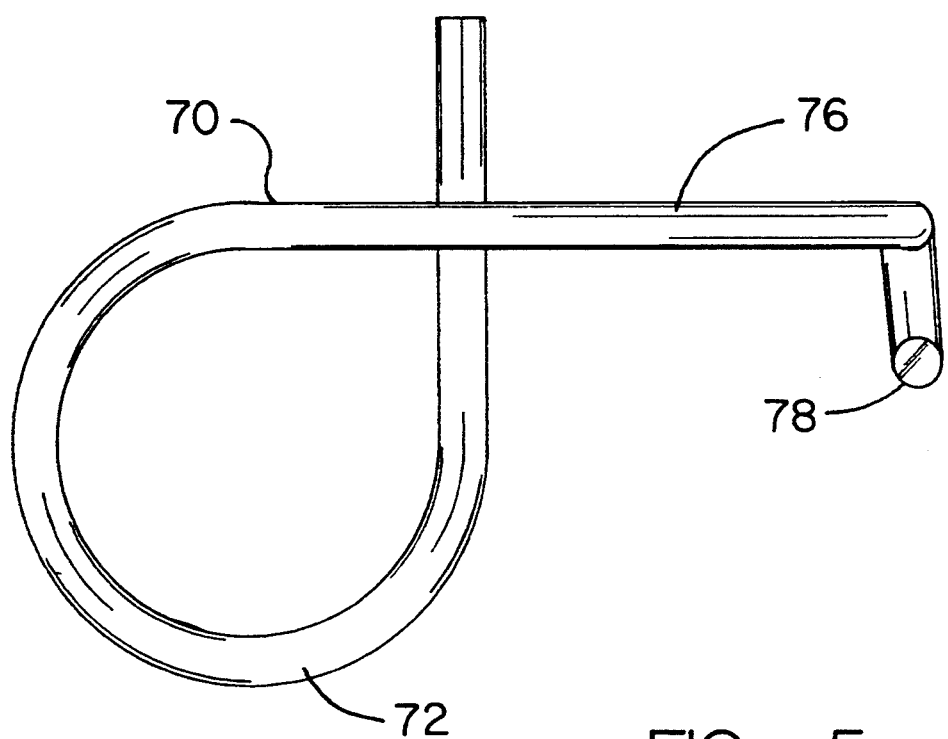
FIG. 5 is an enlarged showing of the locking mechanism for the door taken at circle 5 of FIG. 3.
Figure 6:
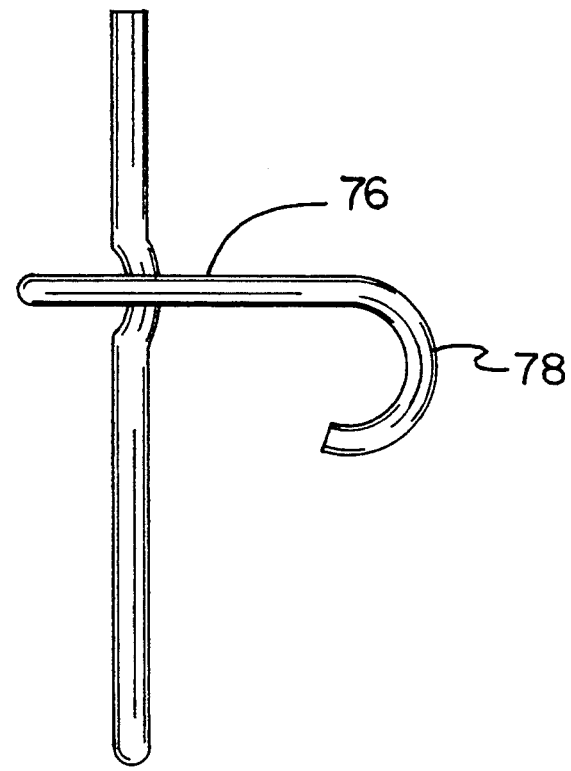
FIG. 6 is an end view of the locking mechanism illustrated in FIG. 5.
Figure 7:
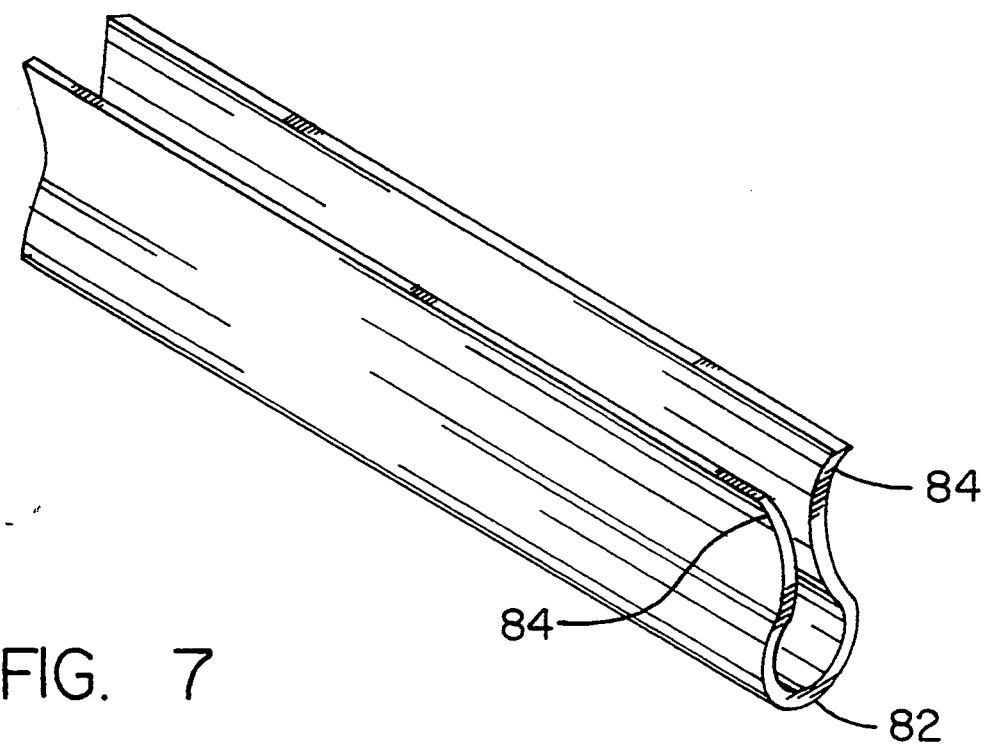
FIG. 7 is a perspective illustration of a plastic door guard located on each side of the doorway of the cage shown in FIGS. 1 and 2.

With reference now to the drawings, and in particular to FIGS. 1 through 7 thereof, the preferred embodiment of the new and improved pet cage door with offset planar section embodying the principles and concepts of the present invention and generally designated by the reference numeral 10 will be described.

The present invention, the new and improved pet cage doors with raised central sections, is constructed of a plurality of separate components. In their broadest context, such components include the cage with a screen front and rectangular opening therein, a rectangular screen functioning as a door, the raised central portion of the screen with beveled sides, wired loops for functioning as hinges, a semi-rigid wire formed as a locking member, and plastic door guards around the opening in the cage front. Such components are specifically configured and correlated one with respect to the other in order to obtain the desired objectives.

More particularly, the pet cage 12 is of a generally conventional construction. It has parallel top and bottom walls, parallel side walls and parallel front and rear walls coupled together at their edges to form a box-like container. The front wall 14 is of a mesh configuration with horizontal and vertical wires 16 and 18. A rectangular opening 20 is formed in the center thereof with a peripheral upper and lower wire 22 and 24 and peripheral edge wires 26 and 28.

Located in association with the cage front is a rectangular screen 32. The screen is formed of a plurality of spaced horizontal and vertical wires 34 and 36 coupled in a mesh-like configuration and constituting a door 38. The door is positionable over the front opening screen of the cage. The door has a height and width which are both greater than the height and width of the opening in the cage front.

The rectangular screen has a raised rectangular central portion 42 and peripheral regions formed vertically and horizontally as extensions of the central portion. The peripheral regions include a top portion 44, a bottom portion 46, an interior lateral portion 48 and an exterior lateral portion 50. The peripheral portions are all beveled at an acute angle with respect to the central portion. Each peripheral portion terminates in a wire, horizontal wires 52 and 54 above and below and vertical wires 56 and 58 interiorly and exteriorly at the vertical edges. Such end wires are adapted to contact the front screen of the cage upwardly of the opening when the door is in a closed orientation.

A plurality of wire loops 62 are formed to encompass the endmost vertical wire of the door and an adjacent vertical wire of the cage proximate to the vertical edge wire of the opening. Such wire loops constitute a hinge 64 for opening and closing the door. At least one of the loops, preferably the top loop 66, is adapted to be located between a vertical wire of the door and an adjacent vertical wire of the cage. This particular loop functions to preclude excess vertical shifting or dropping of the door with respect to the opening. As such, it insures that when closed the door does not fall an excessive amount to cause an inadvertent passage along the upper horizontal extent of the opening.

Next provided is a locking member 70. The locking member is formed from a semi-rigid wire having a loop 72 at its central extent. The locking member is secured to the wires of the door by supplemental wire loops 74. The coupling is adjacent to the vertical edge of the door remote from the hinge. The loop has a horizontal extension 76 extending horizontally to a location outboardly of the door and opening. The loop extends inwardly and is formed with a curve 78 adapted to be releasably moved by a user to encompass a central horizontal wire of the cage front for locking the door with respect to the opening. The wire may be pushed inwardly and lifted whereby the curve will clear its associated wire to allow opening of the door.

The last component of the system is in the nature of a plurality of plastic door guards 82. Such guards are of a generally C-shaped configuration and are positionable over the wires around the opening of the door. The outermost ends 84 of the guards are flared outwardly to allow ease of insertion of the guards into position on the cage opening. Such guards promote safety whereby the user may insert hands and arms into the cage or out of the cage and also to allow passage of a pet through the opening when the door is open.

The present invention is a product that enhances and improves both small and large animal pet cages. Conventional pet cages are made with flat doors. The present invention improves on this design in virtue of the fact that it is a "high profile" door with beveled edges. This new design is not only more attractive, but it is also stronger, safer and fits better over the plastic door guards on each side of the doorway.

Both the cage to which it is attached and the present invention itself are made of steel mesh. Each end of the door angles out away from the cage slightly, after which it bends again, this time by the same degree in the opposite direction, into a parallel position with the front surface of the cage. This is what gives the door a beveled look.

This attribute readily offers a means for the end user to differentiate between a contemporary cage with a conventional door, and one of better quality.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved pet cage door with a raised central section comprising, in combination:

a rectangular screen formed of a plurality of spaced horizontal and vertical wires coupled in a mesh-like configuration and constituting a door, the door being positionable over the front screen of an animal cage formed with a rectangular opening of a predetermined height and width, the door being formed of horizontal and vertical wires with a height and width greater than the height and width of the opening;

the rectangular screen having a raised central portion and peripheral portions formed vertically and horizontally as extensions of the central portion, the peripheral portions being beveled at an acute angle with respect to the central portion and terminating in horizontal and vertical end wires adapted to contact the front screen of the cage when the door is in a closed orientation;

a plurality of wire loops encompassing an endmost vertical wire of the door and an adjacent vertical wire of the cage front screen to constitute a hinge for opening and closing the door, at least one of the loops adapted to be located between a vertical wire of the door and cage front screen to preclude excess vertical shifting of the door with respect to the opening;

a locking member formed from a semi-rigid wire having a loop at its central extent secured by wires to the central portion of the door along one vertical edge remote from the hinge, the loop extending horizontally to a location beyond the door and opening and formed with a curve adapted to be releasably moved by a user to encompass a central horizontal wire of the cage front for locking the door with respect to the opening; and a plurality of plastic door guards of a generally C-shaped configuration positionable over the opening of the door to promote safety for movement of the hands and arms of a user and a pet through the opening when the door is opened.

2. A pet cage door with raised central section comprising:

a rectangular screen formed of a plurality of spaced horizontal and vertical wires coupled in a mesh-like configuration and constituting a door, the door being positionable over the front screen of an animal cage formed with a rectangular opening of a predetermined height and width, the door being formed of horizontal and vertical wires with a height and width greater than the height and width of the opening;

the rectangular screen having a raised central portion and peripheral portions formed vertically and horizontally as extensions of the central portion, the peripheral portions being beveled at an angle with respect to the central portion and terminating in horizontal and vertical end wires adapted to contact the front screen of the cage when the door is in a closed orientation;

a plurality of wire loops encompassing an endmost wire of the door and an adjacent wire of the cage front screen to constitute a hinge for opening and closing the door, at least one of the loops adapted to be located between an endmost wire of the door and cage front screen to preclude excess shifting of the door with respect to the opening; and a locking member formed from a semi-rigid wire having a loop at its central extent secured by wires to the central portion of the door along one edge remote from the hinge, the loop extending to a location beyond the door and opening and formed with a curve adapted to be releasably moved by a user to encompass a central wire of the cage front for locking the door with respect to the opening.

3. The device as set forth in claim 2 and further including:

a plurality of plastic door guards of a generally C-shaped configuration positionable over the opening of the door to promote safety for movement of the hands and arms of a user and a pet through the opening when the door is opened.

* * * * *